US012163369B2

(12) United States Patent
Lee et al.

(10) Patent No.: US 12,163,369 B2
(45) **Date of Patent: *Dec. 10, 2024**

(54) REFRIGERATOR AND METHOD FOR CONTROLLING SAME

(71) Applicant: LG Electronics Inc., Seoul (KR)

(72) Inventors: Sunghun Lee, Seoul (KR); Dongjeong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,280

(22) Filed: Jul. 18, 2023

(65) Prior Publication Data

US 2023/0358091 A1 Nov. 9, 2023

Related U.S. Application Data

(60) Continuation of application No. 17/704,883, filed on Mar. 25, 2022, now Pat. No. 11,746,583, which is a (Continued)

(30) Foreign Application Priority Data

Nov. 3, 2016 (KR) ........................ 10-2016-0145945

(51) Int. Cl.
*E05F 15/00* (2015.01)
*E05F 15/73* (2015.01)
(Continued)

(52) U.S. Cl.
CPC .............. *E05F 15/73* (2015.01); *E05F 15/79* (2015.01); *F25D 23/028* (2013.01); (Continued)

(58) Field of Classification Search
CPC ....... E05F 23/067; E05F 15/02; E05F 15/619; E05F 25/025; E05F 23/021; F25D 23/028; F25D 2323/02; F25D 2400/40; E05Y 2600/56; E05Y 2800/266; E05Y 2201/10; E05Y 2900/31; E05Y 2600/636; E05Y 2201/434; E05Y 2201/716; E05Y 2600/51;
(Continued)

(56) References Cited

U.S. PATENT DOCUMENTS 5,564,286 A 10/1996 Suse
6,343,477 B1 2/2002 Mandel et al.
(Continued)

FOREIGN PATENT DOCUMENTS

CN 2453366 10/2001
CN 1075191 11/2001
(Continued)

OTHER PUBLICATIONS

Extended European Search Report in European Appln. No. 17868381.9, dated Jun. 5, 2020, 10 pages.
(Continued)

*Primary Examiner* — Chi Q Nguyen
(74) *Attorney, Agent, or Firm* — Fish & Richardson P.C.

(57) ABSTRACT

A refrigerator is configured to enable a user to open doors of the refrigerator easily. The refrigerator performs a method for controlling the doors to prevent from opening due to a malfunction.

18 Claims, 7 Drawing Sheets

Related U.S. Application Data division of application No. 16/347,445, filed as application No. PCT/KR2017/012447 on Nov. 3, 2017, now Pat. No. 11,339,602.

(51) Int. Cl.

| | |
|---|---|
| ***E05F 15/79*** | (2015.01) |
| ***F25D 23/02*** | (2006.01) |
| ***F25D 29/00*** | (2006.01) |

(52) U.S. Cl.
CPC ........ *F25D 29/008* (2013.01); *E05Y 2400/32* (2013.01); *E05Y 2400/40* (2013.01); *E05Y 2400/44* (2013.01); *E05Y 2400/856* (2013.01); *E05Y 2900/31* (2013.01); *F25D 2323/021* (2013.01); *F25D 2600/02* (2013.01); *F25D 2700/02* (2013.01); *F25D 2700/04* (2013.01)

(58) Field of Classification Search
CPC .. E05Y 2201/722; A47B 88/483; A47B 88/43
See application file for complete search history.

(56) References Cited

U.S. PATENT DOCUMENTS

| | | | | |
|---|---|---|---|---|
| 8,297,725 | B2 | 10/2012 | Kim et al. | |
| 9,631,857 | B2 | 4/2017 | Yoon et al. | |
| 10,119,751 | B2 | 11/2018 | Choi | |
| 10,202,792 | B2 | 2/2019 | Kim et al. | |
| 10,364,599 | B2 * | 7/2019 | Lee | E05F 15/616 |
| 10,365,033 | B2 | 7/2019 | Furuta et al. | |
| 10,578,349 | B2 * | 3/2020 | Kim | F25D 27/005 |
| 10,619,395 | B2 | 4/2020 | Kim et al. | |
| 11,072,960 | B2 * | 7/2021 | Lee | F25D 23/028 |
| 11,125,005 | B2 * | 9/2021 | Yao | E05F 15/70 |
| 11,150,011 | B2 | 10/2021 | Li et al. | |
| 11,339,602 | B2 | 5/2022 | Lee et al. | |
| 11,448,000 | B2 * | 9/2022 | Cheng | E05F 1/08 |
| 11,746,583 | B2 * | 9/2023 | Lee | F25D 29/008 49/13 |
| 2009/0322470 | A1 | 12/2009 | Yoo et al. | |
| 2011/0048060 | A1 | 3/2011 | Kim et al. | |
| 2011/0050065 | A1 | 3/2011 | Lee et al. | |
| 2011/0083461 | A1 | 4/2011 | Kim | |
| 2014/0239010 | A1 | 8/2014 | Hwang et al. | |
| 2014/0266787 | A1 | 9/2014 | Tran | |
| 2015/0110147 | A1 | 4/2015 | Mizuno | |
| 2015/0198940 | A1 | 7/2015 | Hwang et al. | |
| 2015/0338156 | A1 * | 11/2015 | Held | E05D 7/00 312/405 |
| 2016/0146530 | A1 * | 5/2016 | Jung | E05F 15/611 312/405.1 |
| 2016/0245579 | A1 | 8/2016 | Eom et al. | |
| 2016/0312516 | A1 * | 10/2016 | Heydel | E05F 15/614 |
| 2016/0313050 | A1 * | 10/2016 | Yoon | F25D 23/028 |
| 2017/0234602 | A1 | 8/2017 | Seo et al. | |
| 2017/0261252 | A1 | 9/2017 | Son et al. | |
| 2017/0292777 | A1 | 10/2017 | Lee | |
| 2017/0336132 | A1 | 11/2017 | Chang et al. | |
| 2018/0038634 | A1 | 2/2018 | Kim et al. | |
| 2018/0187770 | A1 * | 7/2018 | Anglin | F02C 7/32 |
| 2018/0292121 | A1 | 10/2018 | Kim et al. | |
| 2019/0292831 | A1 | 9/2019 | Choi | |
| 2019/0323763 | A1 | 10/2019 | Kang | |
| 2019/0330909 | A1 * | 10/2019 | Lee | E05F 15/79 |
| 2021/0396452 | A1 | 12/2021 | Park et al. | |

FOREIGN PATENT DOCUMENTS

| | | |
|---|---|---|
| CN | 1550743 | 12/2004 |
| CN | 102012145 | 4/2011 |
| CN | 104662382 | 5/2015 |
| CN | 104775268 | 7/2015 |
| CN | 105043009 | 11/2015 |
| CN | 105180585 | 12/2015 |
| CN | 105308403 | 2/2016 |
| CN | 106052289 | 10/2016 |
| CN | 108362071 | 8/2018 |
| EP | 2194347 | 6/2010 |
| JP | 2001-040940 | 2/2001 |
| KR | 10-0740800 | 7/2007 |
| KR | 10-2010-0064022 | 6/2010 |
| KR | 10-1457071 | 10/2014 |
| KR | 20-2015-0003072 | 8/2015 |
| KR | 10-2016-0003211 | 1/2016 |
| KR | 10-2016-0029514 | 3/2016 |
| WO | WO 2014/208585 | 12/2014 |

OTHER PUBLICATIONS

Notice of Allowance in Chinese Appln. No. 201780068165.4, dated Jul. 5, 2021, 8 pages (with English translation).
Office Action in Chinese Appln. No. 201780068165.4, dated Jul. 3, 2020, 28 pages (with English translation).

* cited by examiner

REFRIGERATOR AND METHOD FOR CONTROLLING SAME

CROSS-REFERENCE TO RELATED APPLICATIONS

This application is a continuation of U.S. application Ser. No. 17/704,883, filed on Mar. 25, 2022, now U.S. Pat. No. 11,746,583, which is a divisional application of U.S. application Ser. No. 16/347,445, filed on May 3, 2019, now U.S. Pat. No. 11,339,602, which is a National Stage application under 35 U.S.C. § 371 of International Application No. PCT/KR2017/012447, filed on Nov. 3, 2017, which claims the benefit of Korean Patent Application No. 10-2016-0145945, filed on Nov. 3, 2016. The disclosures of the prior applications are incorporated by reference in their entirety.

TECHNICAL FIELD

The present invention relates to a refrigerator, and more particularly, to a refrigerator in which a user is capable of easily opening a door of the refrigerator. The present invention relates to a refrigerator, in which a door of the refrigerator is prevented from being automatically opened by a malfunction, and a method for controlling the same.

BACKGROUND

Refrigerators are household appliances that are capable of store objects such as foods at a low temperature in a storage chamber provided in a cabinet. The storage chamber is surrounded by heat insulating wall so that the inside of the storage chamber is maintained at a temperature less than an external temperature. The storage chamber may be referred to as a refrigerating compartment or a freezing compartment according to a temperature range of the storage chamber.

A user open and close the storage chamber through a door. The user opens the door to put the object into or out of the storage chamber. In general, the door is rotatably provided on the cabinet, and a gasket is disposed between the door and the cabinet. Thus, in a state in which the door is closed, the gasket is closely attached between the door and the cabinet to prevent cold air within the storage chamber from leaking. As the closely attaching force of the gasket increases, the cold air leakage prevention effect may increase.

To allow the closely attaching force of the gasket to increase, the gasket may be provided as a rubber magnet, and a magnet may be provided in the gasket. However, when the closely attaching force of the gasket increases, it means that large force as much as the closely attaching force is required to open the door.

In recent years, a refrigerator having an auto closing function is being provided. The auto closing function means a function of automatically closing the door of the refrigerator when the door of the refrigerator is slightly opened by using the closely attaching force of the gasket, magnetic force, and elastic force of a spring. Also, the auto closing function means that the door of the refrigerator does not open by itself even when the refrigerator is slightly tilted forward.

Thus, the refrigerators provided in recent years require much more force to open the door when compared to the previous refrigerators. This is done because it is necessary to overcome the closely attaching force, the magnetic force, and the elastic force so as to open the door of the refrigerator.

For example, the user may need force of 6 kgf to open the door of the refrigerator. Since this force is relatively large, it is impossible to easily open the door. Also, a problem may arise that the door is rapidly opened because very large force is applied to open the door.

To solve this problem, a refrigerator has been proposed in which a door of the refrigerator is capable of being automatically opened.

For example, a refrigerator has been proposed in which a door of the refrigerator is automatically opened when a user pushes a specific button, or a door is automatically opened when a user touches or drags a specific area.

For example, a refrigerator has been proposed in which a door is automatically opened by sensing approach of the user' body when the user's body or a portion of the user's body approaches a specific position of the refrigerator.

However, the refrigerator according to the related art has a problem that the door is automatically opened even if the user does not intend to do so. For example, the door may be automatically opened if the user simply passes through the front of the refrigerator or if the user simply leans against the door of the refrigerator. In this case, the user may be surprised or hurt by the opening of the door, and clod air may be lost if the opening of the door is maintained. That is, unlike the user's intension, the door may be unnecessarily opened to cause the safety problem and the cold loss.

SUMMARY

A basic object of the present invention is to solve the problem of the above-described refrigerator according to the related art.

An embodiment of the present invention provides a refrigerator that is easily used by reducing user's force required for opening a door of the refrigerator An embodiment of the present invention provides a refrigerator in which a door of the refrigerator is easily opened while maintaining closing force of the door of the refrigerator.

An embodiment of the present invention provides a refrigerator in which a door of the refrigerator is easily opened while maintaining an auto closing function of the refrigerator door.

An embodiment of the present invention provides a refrigerator in which a door of the refrigerator is automatically opened by clearly understanding user's intension of opening the door of the refrigerator.

An embodiment of the present invention provides a refrigerator which is capable of preventing a door of the refrigerator from being automatically opened even though a user does not intend to open the door of the refrigerator.

An embodiment of the present invention provides a refrigerator which is intuitively used by a user to automatically open a door of the refrigerator without grasping a handle of the door by a hand.

An embodiment of the present invention provides a refrigerator in which a user does not need to touch a button or a sensor so as to automatically open a door. Thus, a refrigerator, which is capable of automatically opening a door thereof even when a user holds an object in both hands, and a method for controlling the same are provided.

An embodiment of the present invention provides a refrigerator which is capable of preventing a door of the refrigerator from being opened by a malfunction through a control method without adding a new configuration.

An embodiment of the present invention provides a refrigerator which is capable of effectively opening one door through one door opening device and a method for controlling the same.

An embodiment of the present invention provides a refrigerator which is capable of effectively opening a plurality of doors through one door opening device and a method for controlling the same.

An embodiment of the present invention provides a refrigerator in which a user is capable of easily selecting a specific opening mode in the refrigerator having a plurality of door opening modes and a method for controlling the same.

An embodiment of the present invention provides a refrigerator in which a user intuitively understands which door opening mode is performed to open a door through notification and a method for controlling the same.

An embodiment of the present invention provides a refrigerator in which malfunction conditions of a door opening device are sequentially removed and a method for controlling the same. For example, conditions such as a case in which the door opening device operates in the state in which the door is opened, a case in which the user passes through the front of the refrigerator, or a case in which the user is located in the front of the refrigerator for a long time are sequentially removed.

To realize the above objects, according to an embodiment of the present invention, a refrigerator includes: a cabinet having a storage chamber; left and right doors configured to opened and close the storage chamber; a sensor configured to sense whether a user is within a sensing distance, the sensor being configured to distinguish sensing-on and sensing-off from each other; a door opening device configured to automatically open the left and right doors; and a control unit configured to determine a driving condition of the door opening device on a basis of a sensing-on duration time and a time interval till the sensing-off after the sensing-on so as to control the driving of the door opening device in one of the plurality of door opening modes.

The door opening device may include: a single motor; and left and right racks moving forward by driving of the single motor to respectively push the left and right doors.

The plurality of door opening modes may include a left door opening mode and a right door opening mode.

The plurality of door opening modes comprise an opening mode in which one of the left door and the right door is opened and an opening mode in which all of the left door and the right door are opened.

The opening of the left door and the right door may be sequentially performed in the opening mode in which all of the left door and the right door are opened.

When the sensing-on duration time is less than a preset time (T1), the control unit may determine that the driving condition is not satisfied.

After the preset time (T1) elapses, the control unit may determine whether the sensing-off is performed.

After the preset time (T1) elapses, when a time spent for the sensing-off is less than a preset time (T2), the door opening device may be driven in a first driving mode of the plurality of driving modes.

After the preset time (T1) elapses, when a time spent for the sensing-off is less than a preset time (T3) that is greater than the preset time (T2), the door opening device may be driven in a second driving mode of the plurality of driving modes.

The refrigerator may further include a notification device for notifying that the door opening device is scheduled to be driven to the user.

The control unit may control a driving of the notification device so that different beeps are generated according to the opening modes of the door opening device.

The notification device may include a buzzer that generates a beep sound, and the different opening modes may be distinguished from each other through the number of beep sounds.

The refrigerator may further include a door switch configured to sense the opening and closing of the left and right doors, wherein the control unit may determine whether the driving condition of the door opening device is satisfied when the closing of the left and right doors are sensed by the door switch.

To realize the above objects, according to an embodiment of the present invention, a method for controlling a refrigerator includes: performing sensing-on to sense whether a user is within a sensing distance through a sensor; performing primary determination to primarily determine that the user intends to open at least one of the left or right door in which the storage chamber is opened and closed when a sensing-on duration time is equal to or greater than a preset time (T1); performing sensing-off to sense whether the user is out of the sensing distance through the sensor after the primary determination; performing secondary determination to select one of the plurality of door opening modes according to a time spent till the sensing-off after the primary determination; and performing door opening by driving a door opening device, which opens the left and right doors, according to the selected mode.

The secondary determination may include determining whether the first mode is selected and determining whether the first mode is not selected, but the second mode is selected. When the second mode is not selected, it may be finally determined that the user does not intend to open the door.

The plurality of door opening modes may include a mode in which one of the left and right doors is opened.

The plurality of door opening modes may include a mode in which all of the left and right doors are opened.

After the primary determination, notification may be performed to notify that the door opening device is scheduled to be driven to the user.

In the notification, the notification may be performed in different manners according to the plurality of door opening modes.

After the primary determination, when a time spent for the sensing-off is less than a preset time (T2), a first driving mode of the plurality of driving modes may be selected.

After the primary determination, when the time spent for the sensing-off is less than a preset time (T3) that is greater than the preset time (T2), a second driving mode of the plurality of driving modes may be selected.

When the preset time (T3) elapses to perform the sensing-off, the operation may be returned to the sensing-on. That is, it may be finally determined that the user does not intend to open the door.

To realize the above objects, according to an embodiment of the present invention, a refrigerator includes: a cabinet having a storage chamber; a door configured to open and close the storage chamber; a sensor configured to sense whether a user is within or out of a sensing distance to distinguish sensing-on and sensing-off from each other; a door opening device configured to automatically open the door; and a control unit configured to determine a driving condition of the door opening device on the basis of a sensing-on duration time and a time interval till the sensing-off after the sensing-on so as to control the driving of the door opening device.

Here, the driving condition of the door opening device may mean a condition for driving the door opening device.

Also, the driving condition of the door opening device may mean a condition of determining which door opening mode is performed.

First, the driving condition of the door opening device may include a condition of driving the door opening device as a primary driving condition of the door opening device. When the primary condition is satisfied, a condition of secondarily determining which mode is performed may be required. When this condition is satisfied, a specific mode may be performed. Also, when this condition is not satisfied, a tertiary condition of determining whether or not to be driven in a different specific mode may be required. When the tertiary condition is satisfied, a different specific mode may be performed. When the tertiary condition is not satisfied, finally, the door opening device may not be driven.

When the sensing-on duration time is less than a preset time (t1), the control unit may determine that the driving condition is not satisfied. As a result, when the user is passing by the refrigerator, the door opening device may not operate.

When the sensing-on duration time is greater than a preset time (t1), the control unit may determine whether the sensing-off is performed.

When the sensing-off is not performed during a preset time, the control unit may determine that the driving condition is not satisfied. As a result, when the user or an object is located at the front of the refrigerator for a long time, the door opening device may not operate.

When it is determined that the sensing is off, if a time spent for the sensing-off after the sensing-on is less than a preset time (t1+t2), the control unit may determine that the driving condition is satisfied.

The preset time (t1) may correspond to a time for which the user intents to open the door and maintain access to the door, and the preset time (t2) may be determined corresponding to a time for which the user is out of the door to form an opening space of the door. Thus, the malfunction of the door opening device may be prevented in stages.

The refrigerator may further include a notification device, wherein the notification device may operate before the door is opened.

When the sensing-on duration time is equal to or greater than the preset time (t1), the control unit may control an operation of the notification device so that the user is notified that the door is scheduled to be opened.

The refrigerator may further include a door switch configured to sense whether the door is opened or closed, wherein the control unit may determine whether the driving condition of the door opening device is satisfied when the closing of the door is sensed by the door switch.

To realize the above objects, according to an embodiment of the present invention, a method for controlling a refrigerator includes: performing sensing-on to sense whether a user is within a sensing distance through a sensor; performing primary determination to primarily determine that the user intends to open the door when a sensing-on duration time is equal to or greater than a preset time (t1); performing sensing-off to sense whether the user is out of the sensing distance through the sensor after the primary determination; performing secondary determination to secondarily determine that the user intends to open the door when a time spent for the sensing-off after the sensing-on is less than a preset time (t1+t2); and performing door opening by driving a door opening device after the secondary determination to automatically open the door.

After the primary determination, if the sensing-off is not performed for a preset time (t3), the operation may be returned to the sensing-on after the sensing-off is performed.

The sensing-on may include initializing a time to count a time after the sensing-on.

After the primary determination, notification may be performed to notify that the door is scheduled to be opened to the user is performed.

After the notification, the sensing-off may be performed.

The method may further include performing door opening determination to determine whether the door is opened or closed through a door switch.

In the door opening determination, when it is determined that door is closed, the sensing-on may be performed.

To realize the above objects, according to an embodiment of the present invention, a method for controlling a refrigerator includes: performing sensing-on to sense whether a user is within a sensing distance through a sensor; performing primary determination to primarily determine that the user intends to open the door when a sensing-on duration time is equal to or greater than a preset time (t1); performing notification to drive a notification device and notify that the door is scheduled to be opened to the user is performed after the primary determination; performing sensing-off to sense whether the user is out of the sensing distance through the sensor after the notification; and performing door opening by driving a door opening device to automatically open the door after the secondary determination.

The notification may include confirming the intension of the user once again to open the door, rather than simply notifying that the door is scheduled to be opened to the user. This is done because the user has to move for the sensing-off through the notification. Due to the movement, the user's intension to open the door may be more clearly confirmed.

The notification device may include a buzzer that generates a beep sound. That is, the notification device may be a device for generating sound.

The method may further include performing door opening determination to determine whether the door is opened or closed through a door switch.

In the door opening determination, when it is determined that door is closed, the sensing-on may be performed.

The embodiment of the present invention may provide the refrigerator that is easily used by reducing the user's force required for opening the door of the refrigerator The embodiment of the present invention may provide the refrigerator in which the door of the refrigerator is easily opened while maintaining the closing force of the door of the refrigerator.

The embodiment of the present invention may provide the refrigerator in which the door of the refrigerator is easily opened while maintaining the auto closing function of the refrigerator door.

The embodiment of the present invention may provide the refrigerator in which the door of the refrigerator is automatically opened by clearly understanding the user's intension of opening the door of the refrigerator.

The embodiment of the present invention may provide the refrigerator which prevents the door of the refrigerator from being automatically opened even though the user does not intend to open the door of the refrigerator.

The embodiment of the present invention may provide the refrigerator which is intuitively used by the user to automatically open the door of the refrigerator without grasping the handle of the door by the hand.

The embodiment of the present invention may provide the refrigerator in which the user does not need to touch the button or the sensor so as to automatically open the door. Thus, the refrigerator, which is capable of automatically opening the door thereof even when the user holds the object in both hands, and the method for controlling the same may be provided.

The embodiment of the present invention may provide the refrigerator which is capable of preventing the door of the refrigerator from being opened by the malfunction through the control method without adding the new configuration.

The embodiment of the present invention may provide the refrigerator which is capable of effectively opening the one door through the one door opening device and the method for controlling the same.

The embodiment of the present invention may provide the refrigerator which is capable of effectively opening the plurality of doors through the one door opening device and the method for controlling the same.

The embodiment of the present invention may provide the refrigerator in which the user is capable of easily selecting the specific opening mode in the refrigerator having the plurality of door opening modes and the method for controlling the same.

The embodiment of the present invention may provide the refrigerator which is capable of intuitively understanding whether the user opens the door in any door opening mode through the notification and the method for controlling the same.

The embodiment of the present invention may provide the refrigerator in which the malfunction conditions of the door opening device are sequentially removed and the method for controlling the same. For example, conditions such as a case in which the door opening device operates in the state in which the door is opened, a case in which the user passes through the front of the refrigerator, or a case in which the user is located in the front of the refrigerator for a long time are sequentially removed.

DETAILED DESCRIPTION

Figure 1:
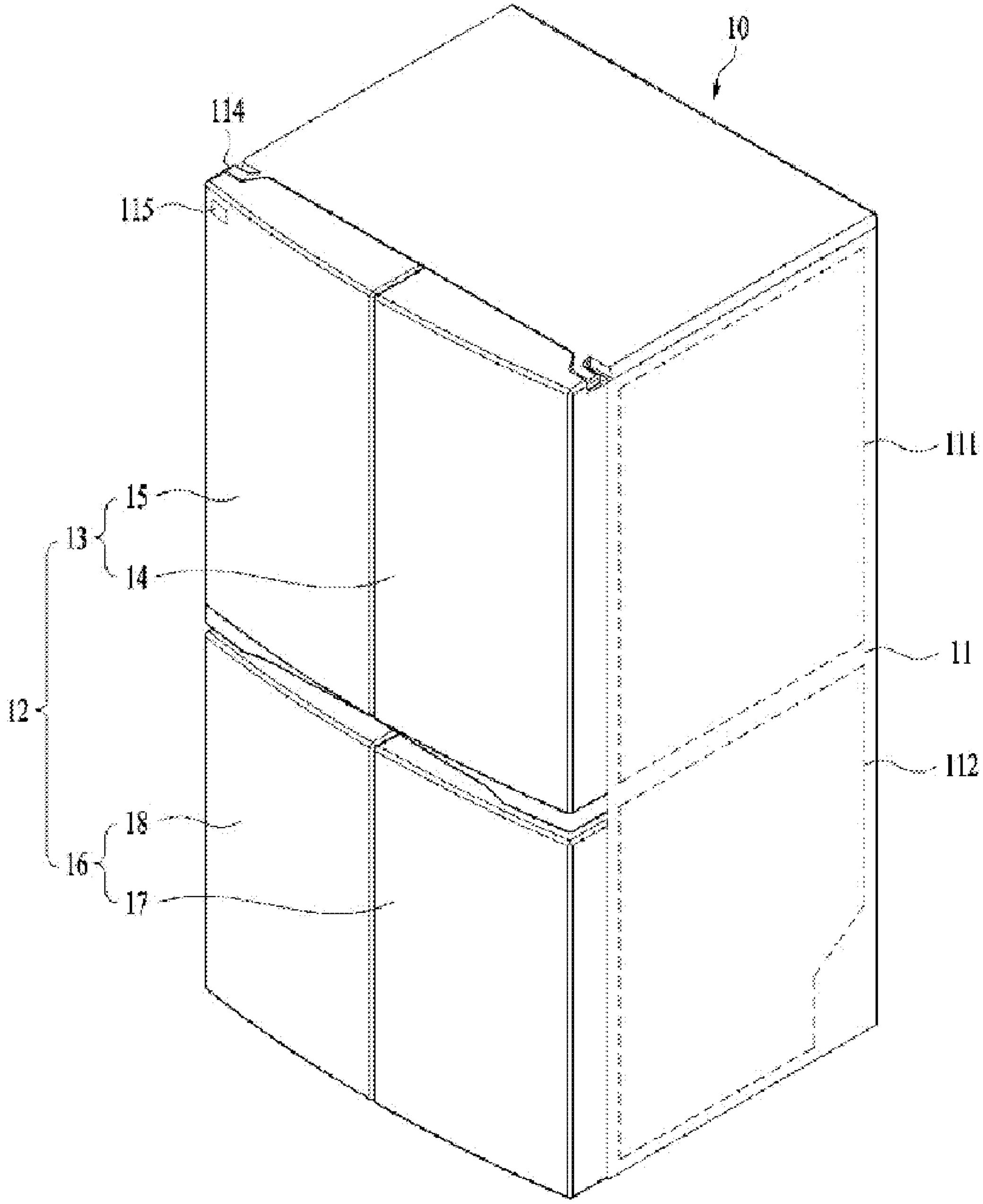
FIG. 1 is a perspective view of a refrigerator that is applicable to an embodiment of the present invention.

Hereinafter, preferred embodiments of the present invention will be described with reference to the drawing.

FIG. 1 is a perspective view of a refrigerator that is applicable to an embodiment of the present invention. For example, a structure in which two doors that open and close an upper refrigerating compartment and two doors that open and close a lower freezing compartment are provided is illustrated.

The refrigerator according to an embodiment of the present invention may include a cabinet 10 having a storage chamber and further include a door 12 provided on the cabinet 10. The storage chamber defined by the cabinet may be opened and closed through the door 12. Thus, the refrigerator may have an outer appearance defined by the cabinet 10 and the door 12.

Since a user uses the refrigerator at a front side of the refrigerator, the door is disposed on the front of the refrigerator.

For example, a refrigerating compartment door 13 for opening and closing the refrigerating compartment 111 may be provided. The refrigerating compartment door 13 may be constituted by left and right doors 15 and 14. Also, a freezing compartment door 16 for opening and closing the freezing compartment 112 may be provided. The freezing compartment door 16 may be constituted by left and right doors 18 and 17.

The door 12 may be provided to be rotatable through a door hinge 114. That is, the door 12 may be provided to be rotatable with respect to the cabinet through the door hinge 114.

The user may grasp the door 12 to open and close the door. For this, a handle is provided on the door. In FIG. 1, an example in which handles 14*a*, 15*a*, 17*a*, and 18*b* are respectively on the doors 14, 15, 17, and 18 is illustrated.

That is, when the user intends to open the door, a hand of the user is intuitively accessed to the handles. Also, the user grasps the handles to apply force for pulling the door. Embodiments of the present invention may be provided to improve user's convenience by using the user's intuitive operation.

Figure 2:
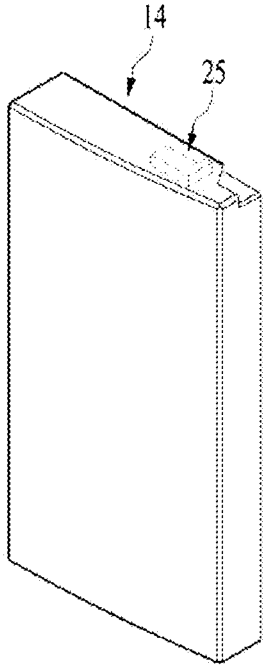
FIG. 2 is a perspective view of a door illustrated in FIG. 1.

FIG. 2 is a perspective view of the door illustrated in FIG. 1. For convenience of description, the left refrigerating compartment door 14 is illustrated.

Embodiments of the present invention may include a door opening device 25 that automatically opens the door. That is, a device for automatically opening the door through an electric motor may be provided. As illustrated in FIG. 2, the device may be provided in the door. On the other hand, the device may be provided in the cabinet.

The door opening device 25 is driven in preset conditions or states. The door opening device 25 is driven to automatically open the door. Thus, user's force required for opening the door may be significantly reduced. Alternatively, a sensor for determining the preset condition or state is necessary. The sensor will be described later.

Figure 3:
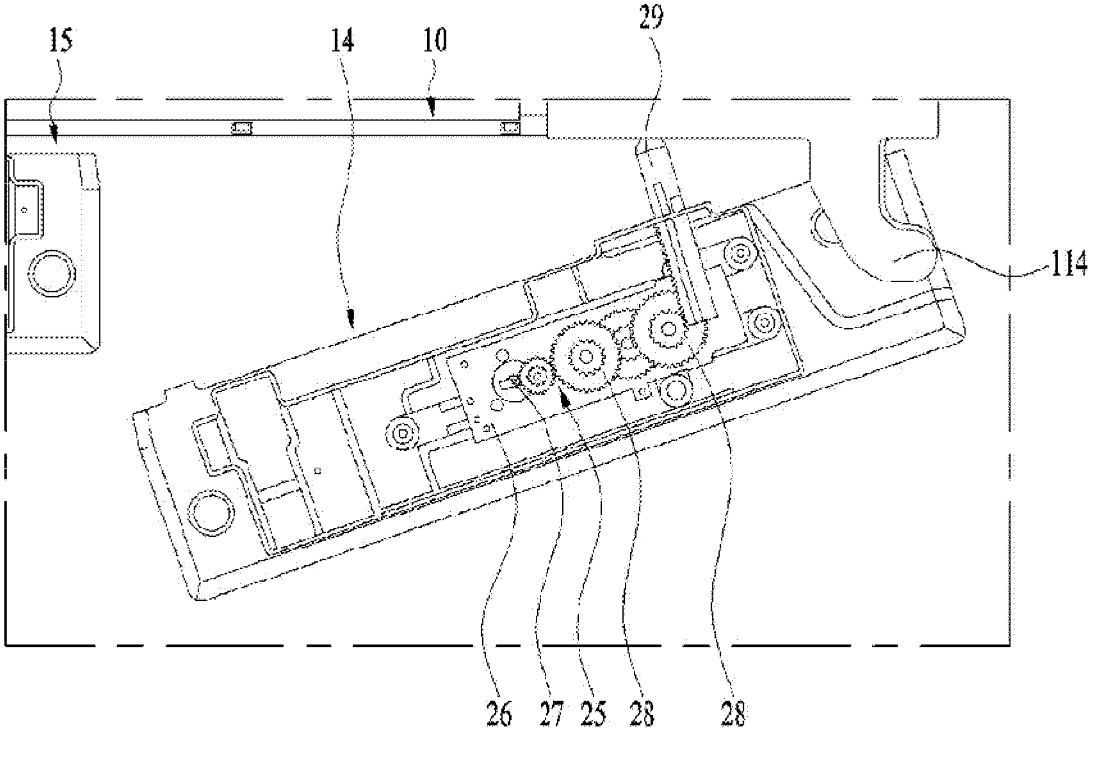
FIG. 3 is a plan view illustrating an example of an operation of a door opening device that is applicable to an embodiment of the present invention.
Figure 4:
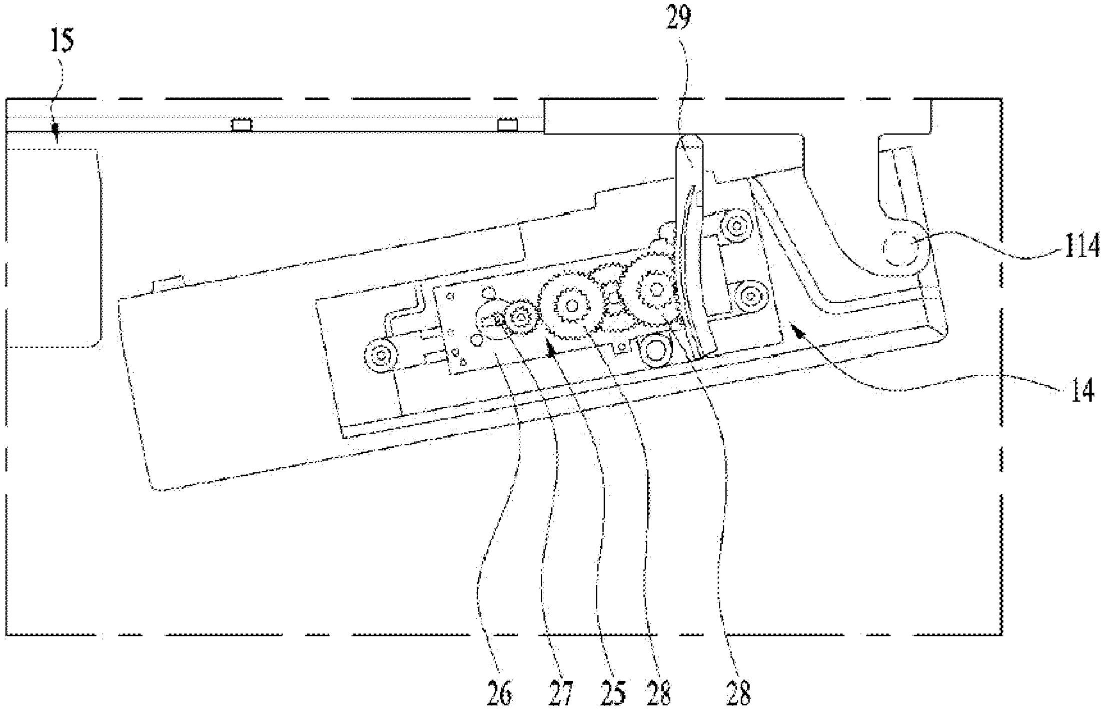
FIG. 4 is a plan view illustrating another example of the operation of the door opening device that is applicable to an embodiment of the present invention.
Figure 5:
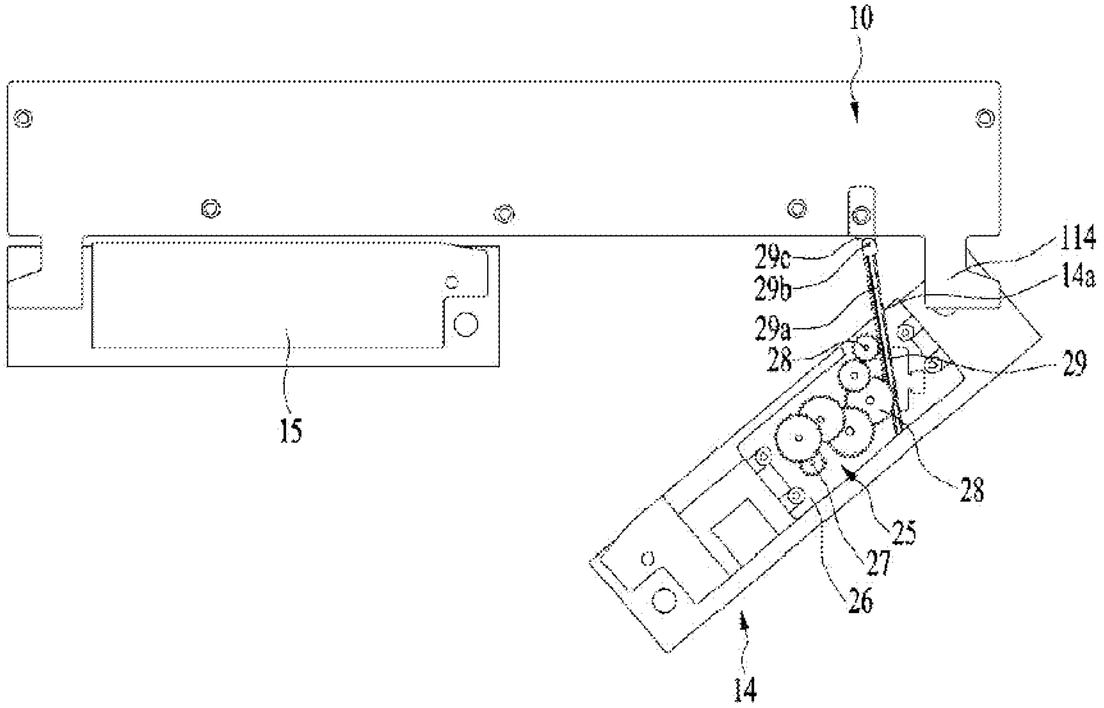
FIG. 5 is a plan view illustrating further another example of the operation of the door opening device that is applicable to an embodiment of the present invention.

FIGS. 3 to 5 illustrate examples of the door opening device 25 that is applicable to an embodiment of the present invention. Particularly, an example in which the door opening device is provided at the door 14 is illustrated. Also, a structure in which the door opening device is disposed on a top surface of the door is illustrated. That is, an example in which the door opening device 25 is mounted on a cap deco portion of the door is illustrated.

Hereinafter, each of the door opening devices 25 will be described in detail.

The door opening device 25 includes a housing 26. At least one or more gears 28 may be accommodated in the housing 26. The gears 28 operate by driving of a motor 26. The rotation of the motor 26 that rotates at a high speed may be decelerated through the gears 28. At least a portion of the motor 26 may be accommodated in the housing 26.

The housing 26 may be provided to be fixed to the door 14. The housing 26 may be mounted on a top surface of the door 14, and then, a cap decor (not shown) may cover the top surface of the door 14. Thus, most constituents of the door opening device including the housing 26 may be mounted in the door 14 so as to be protected from the outside.

The motor 26 is driven to open the door 14. Here, the gears 28 may also be driven by the driving of the motor 26. The driving force of the motor 26 may be transmitted to a rack 29 through the gears 28.

The rack 29 may be a constituent provided to protrude from the housing 26. That is, the rack 29 may be a constituent protruding from the housing and having a variable protruding length.

FIG. 3 illustrates a configuration in which the rack 29 further protrudes to the outside of the housing 26 to further protrude to the outside of the door 14. Thus, as the rack 29 increases in protruding length, the rack 29 may apply force so that the door 14 is away from the cabinet 10. On the other hand, in the state in which the door 14 is closed, the protruding length of the rack 29 may be minimized. That is, it is preferable that a length of the rack 29, which protrudes to the outside of the door 14, is minimized.

Here, the protruding length of the rack 29 may be proportional to an opening angle of the door 14. This is done because, when the door 14 rotates by using the door hinge 114 as a center, the rack 29 is maintained to contact the cabinet 10. However, as described below, since the contact position between the rack 29 having a linear shape and the cabinet 10 varies, the protruding length of the rack 29 and the opening angle of the door 14 may not be directly proportional to each other.

The increase of the protruding length of the rack 29 is limited. That is, an increase of an angle at which the door is automatically opened is limited. This is done because the protruding length of the rack 29 is not greater than a length of the rack 29. Also, this is done because the length of the rack is not greater than a front/rear width of the door 14, i.e., a thickness of the door.

Alternatively, the rack 29 may pass through the door 14 in forward and backward directions. However, in this case, a problem of design may be caused very seriously. Also, the exposure of the rack 29, which moves to the front of the refrigerator, may cause not only a design problem but also that the overall door opening device becomes complicated.

The rack 29 linearly moves. That is, in the state in which the door is closed, the rack 29 and the cabinet 10 are disposed to perpendicular to each other. However, as the angle at which the door is opened increases, an angle between the rack 29 and the cabinet 10 may vary. This means that a portion on which the rack 29 and the cabinet 10 contact each other moves.

Thus, a distal end of the rack 29 may be worn, or a portion of the cabinet, which contacts the distal end of the rack 29, may also be worn.

FIG. 4 illustrates a shape in which the door opening device 25 described in FIG. 3 is improved.

Although the rack 29 described in FIG. 3 linearly moves, the door opening device 25 may move in a curved shape. That is, other constituents are the same, but only a shape of the rack 29 is different.

The rack 29 may have a curved shape on the whole. Alternatively, the distal end of the rack 29 may be a straight line shape, and only a portion contacting the gear 28 may have a curved line shape. The curved line may have a constant radius with respect to the door hinge 114.

The rack 29 may protrude with a constant radius with respect to the door hinge 114. That is, when the motor 26 is driven, the rack 29 may protrude from the door 14 to push the cabinet 10. Thus, the proportional relationship between the protruding length of the rack 29 and the opening angle of the door 14 may be satisfied. Therefore, the rack 29 having the curved shape rather than the rack 29 having the linear shape may be used to relatively increase in opening angle of the door.

Also, a contact position between the rack 29 and the cabinet 10 may be always constant. Thus, problems that may occur as the contact position is changed in the state in which the rack 29 and the cabinet 10 contact each other may be solved.

However, it may be difficult to manufacture the rack 29 having the curved shape, and manufacturing cost may increase. Also, the curved line of the rack 29 has to be mounted to have a constant radius with the door hinge 114. That is, if the mounted position is not accurate, various problems may occur. Thus, the mounted position may be very limited, and also, vary accurate mounting may be required.

FIG. 5 illustrates a shape in which the door opening device 25 described in FIG. 3 is improved.

Although the rack 29 described in FIG. 3 linearly moves, the door opening device 25 may diagonally move. That is, other constituents are the same, but only a shape of the rack 29 is different.

Particularly, the rack 29 illustrated in FIG. 3 may have a shape that protrudes at an angle that is perpendicular to the door 14. However, in the door opening device 25, the rack 29 may have a shape that protrudes at an angle that is diagonal with respect to the door 14. That is to say, the rack 29 illustrated in FIG. 3 moves in the same direction as the thickness direction of the door 14. However, the rack 29 according to this embodiment may move in a direction that is tilted with respect to the thickness direction of the door 14.

Thus, in this embodiment, the rack 29 may have a length that is further greater than the thickness of the door 14. That is, this means that the protruding length of the rack 29 further increases. Thus, the angle at which the door is automatically opened may more increase.

In the above-described door opening devices, the opening angle of the door may increase according to the protruding length of the rack. Thus, when the rack maximally protrudes, the opening angle of the door may be maximized. However, thereafter, the user holds the handle to more rotate the door. Thus, the door opening devices may provide force for opening the door up to an automatic opening angle of the door. However, when the door is initially opened, relatively large force may be required, and thus, the user may very conveniently open the door.

Hereinbefore, embodiments of the door opening device that is capable to this embodiment have been described. However, the door opening device having various shapes without being limited to the above-described embodiments may be applied to this embodiment. For example, the door opening device mounted on the cabinet rather than the door may be applied. Also, for example, the door opening device of which both doors are opened rather than the door opening device of which only one door is opened may be applied.

Hereinafter, a control configuration of the refrigerator according to an embodiment of the present invention will be described in detail with reference to FIG. 6.

A sensor 115 senses user's intension for opening the door. In this embodiment, the sensor 115 may be a distance sensor or a human body sensor instead of a sensor that is directly pressed or touched by the user. That is, as illustrated in FIG. 1, the sensor 115 may be mounted on the front surface of the refrigerator. Thus, the sensor 115 may sense that the user approaches the refrigerator.

Since the sensor 115 is not touched by the user, the user need not perform a special operation. That is, the user have only to simply approach the refrigerator. Thus, it may be very effective when it is difficult to open the door due to objects held in both hands or when a separate touch is difficult.

When the user's approach is sensed by the sensor 115, and it is determined that the user intends to open the door, the control unit 110 may control an operation of the door opening device 25 to automatically open the door.

The sensor 115 may be provided to sense whether the user is within or out of a sensing distance. The former may be sensing-on and the latter may be sensing-off.

A time for which the sensing-on is continuous may be counted in the sensor 115. Also, a time for which the sensing-off is continuous after the sensing-on is continuous may be counted. The user's door opening intension may be clearly determined on the basis of the counted times. That is, a case in which there is no user's door opening intention may be distinguished to prevent the door from being opened by a malfunction.

In this embodiment, a door switch 200 and a notification device 300, which are control configurations of the general refrigerator may be provided. The door switch 200 may be a configuration for simply determining only opening and closing of the refrigerator. When the opening of the door is sensed in the door switch 200, a lighting device within the storage chamber may be turned on, and when the closing of the door is sensed in the door switch 200, the lighting device may be turned off.

Also, when the door of the refrigerator is opened for a predetermined time or more, a notification sound or a beep sound may be generated in the notification device 300, for example, a buzzer. That is, the notification sound may alert the user to the attention.

Figure 6:
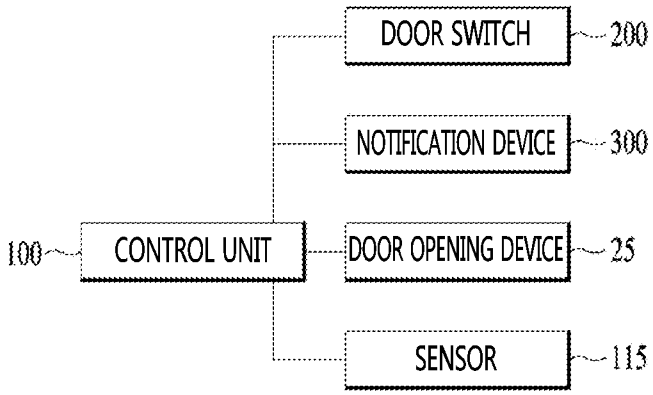
FIG. 6 is a block diagram of a control configuration that is applicable to an embodiment of the present invention.

It is seen that the control configuration illustrated in FIG. 6 is not so different from the control configuration of the general refrigerator. However, an embodiment of the present invention may provide a refrigerator, which is capable of significantly reducing the malfunction of the door through the sensor 115 that senses the user's approach, and a control method.

Figure 7:
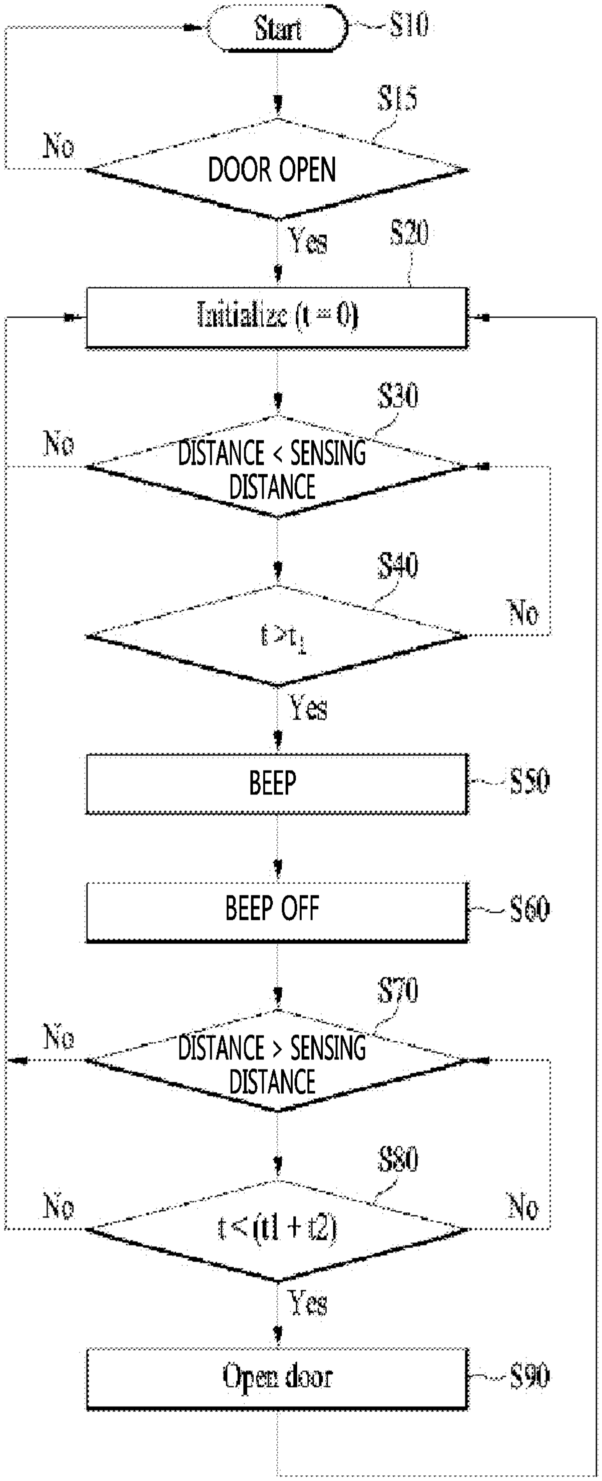
FIG. 7 is a flowchart illustrating a control method that is applicable to an embodiment of the present invention.

Hereinafter, a control method of the refrigerator according to an embodiment of the present invention will be described in detail with reference to FIG. 7.

In an initial operation or a starting operation (S10) may be performed. That is, preparation for driving the door opening device may be performed.

To open the door, whether the user intends to open the door has to be determined. In this embodiment, the approach of the user to the refrigerator may be primarily determined that the user intends to open the door. This is done because the opening of the door is based on the approach of the user to the refrigerator.

Thus, in this control method, the sensing-on (S30) may be performed to determine whether the user is within the sensing distance through the sensor 115. It may be said that a first gate for door opening has been passed until the sensing-on is performed.

However, it may be that the user does not approach the refrigerator to open the door, but just to pass by the refrigerator. Thus, in this case, it is preferable that the door has not to be opened. In this case, a time for which the sensing-on is continuous in the sensor may be relatively less.

Thus, to prevent this malfunction from occurring, the primary determination (S40) may be performed. That is, the primary determination for determining whether the user truly intends to open the door may be performed. In the primary determination (S40), the sensing-on duration time may be compared to a preset time t1.

When the sensing-one duration time is greater than the preset time t1, it may be primarily determined that the user intends to open the door. The preset time t1 may be a relatively short time for which the user passes by the refrigerator. Thus, when the sensing-on is continuous for about 1 second or more, it may be primarily determined that the user intends to open the door.

The user may perform other operations in the front of the refrigerator without intending to open the door. For example, the user may clean the front of the refrigerator or stand on the refrigerator. In this case, it is preferable that the door of the refrigerator is not automatically opened.

Due to the characteristics of the refrigerator, a predetermined distance from the user has to be maintained to open the door. In the use of the general refrigerator, the user may be spaced a predetermined from the refrigerator and then hold the door of the refrigerator to open the door. Also, the user may more approach the refrigerator to take foods out of the storage chamber. Thus, when the user opens the door, the user intuitively know that the door has to be maintained at a predetermined distance from the refrigerator.

In consideration of the use pattern of the refrigerator, the user may move to be spaced a predetermined distance from the refrigerator so as to open the door of the refrigerator. That is, after the user approaches the refrigerator, the user may be disposed at a position that is a little further away from the refrigerator to open the door of the refrigerator.

In consideration of this, it is preferable that secondary determination (S70) is performed after the primary determination. That is, it is determined whether the user moves to secure a space for opening the door. This moving time is not relatively long. Thus, in this case, it may be determined that the user is willing to open the door before the present time elapses after the first determination.

If the preset time elapses so that the sensing-off is performed, the user may determine that the user performs cleaning or the like without intending to open the door as described above. Thus, when the sensing-off (S70) is not performed during the preset time t3, the sensing-on (S30) may be returned after the sensing-off.

Here, the time counting may be performed continuously and may be performed step by step. In FIG. 7, an example in which the time counting is continuously performed from the sense-on to the secondary determination (S80) is illustrated. For this, resetting (S20) of resetting the time before the initial operation, i.e., the sensing-on is performed may be performed. Alternatively, the resetting (S20) may be included in the sensing-on (S30).

After the sensing off (S70) is performed, when the sensing-off is performed before the preset time (t1+t2) added with the sensing-off duration after the sensing-on duration elapses, the secondary door opening intention of the user may be confirmed.

Thus, the opening (S90) of the door by driving the door opening device may be finally performed through the confirmation (S80) of the secondary door opening intention of the user.

The control method may be performed based on the case in which the door is closed. Thus, determination (S15) of determining whether the door is closed may be performed as the premise of the determination of determining an opening condition of the door.

The determination (S15) may be performed through the door switch. Thus, when the opening of the door is determined through the door switch, unnecessary operations may be previously prevented from being performed.

The control method may include notification (S50 and S60) of previously notifying the opening of the door to the user. That is, the notification (S50 and S60) may be performed to notify that the door is scheduled to be automatically opened or that the door opening device is scheduled to operate.

The notification may be also referred to as a signal that the user is away from the door because the door is scheduled to be opened. Also, the notification may be referred to as a signal for confirming the user's intention to open the door. When the notification is ignored, and the user does not move, the condition of the subsequent secondary determination (S80) may not be naturally satisfied.

Here, when the notification (S50 and S60) are performed, the secondary determination (S80) may be omitted, and the door opening (S90) may be performed. That is, when the sensing-off (S70) is performed after the notification, the door opening may be immediately performed.

The notification may be an operation of generating sound such as beep sound. That is, the notification device may be provided as a buzzer shape generating the beep sound. Thus, even though the user's gaze leaves the refrigerator, the user may hear what is happening in the refrigerator through the auditory sense. That is, the user may intuitively know that the door of the refrigerator is automatically opened by listening the beep sound.

As described above, the user's door opening intention may be clearly understood to prevent the door from being malfunctioned. Also, this may be achieved through the control without additional configuration.

Also, according to the foregoing embodiment, the door opening device that opens one door may be controlled without the malfunction. Furthermore, that the door opening is scheduled may be notified to the user through the notification such as the beep sound to secure a sufficient space for opening the door.

The malfunction of the door opening device may be caused not only in the door opening device that opens one door but also in the door opening device that opens two doors.

For example, the malfunction may also occur in a case in which two doors opening and closing one storage chamber are provided on left and right sides. The malfunction may occur when each of the doors is opened by using a separate door opening device as well as when the doors are opened through one door opening device.

Figure 8:
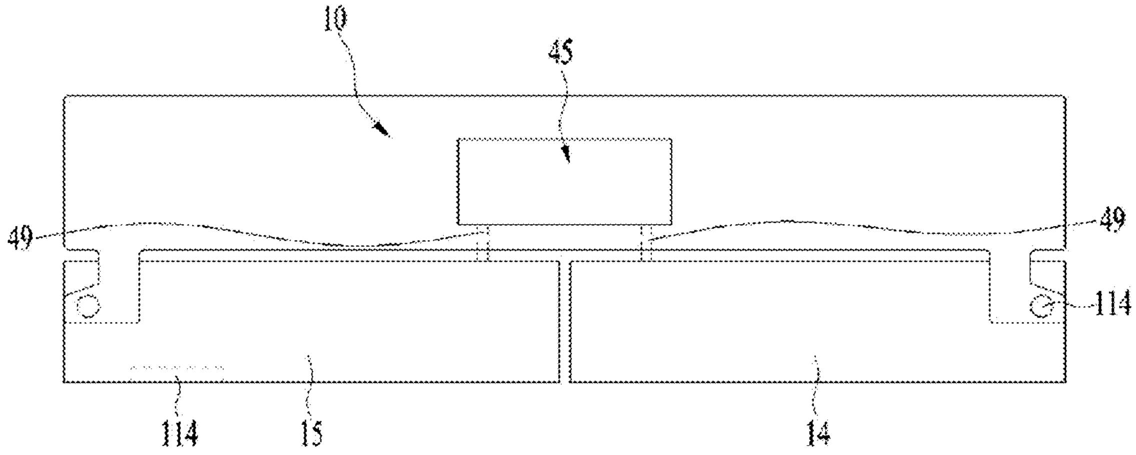
FIG. 8 is a conceptual view of a refrigerator that is applicable to another embodiment of the present invention.

FIG. 8 illustrates a concept in which two doors are opened through one door opening device. For example, a concept in which left and right doors 15 and 14 are opened through one door opening device 45 disposed on the top surface of the cabinet 10.

In this embodiment, the sensor 115 may be similarly provided. The sensor 115 may be a sensor for sensing whether the user approaches the refrigerator as described above.

Thus, the same problem as described above may occur in the refrigerator in which the left and right doors are opened through one door opening device. Particularly, even when the door opening intention of the user is determined through one sensor 115, the same problem such as the malfunction of the door opening device may occur.

Hereinafter, an embodiment of a control method for solving the problem in the refrigerator illustrated in FIG. 8 will be described in detail. The configuration required in this embodiment may be the same as that in the foregoing embodiment. However, the door opening device according to this embodiment is different from the door opening device according to the foregoing embodiment in that two doors but not one door are opened. For example, FIG. 8 illustrates two racks 49 for respectively opening the left and right doors in one door opening device. Thus, duplicated description with respect to the same characteristic as the foregoing embodiment will be omitted.

Since a refrigerator in which two left and right doors or a plurality of doors are automatically opened is provided, an opening mode of the doors may be provided in plurality. That is, structures in which the plurality of doors are opened may be different from the plurality of door opening modes.

For example, the plurality of door opening modes may include an opening mode in which only any door is opened. Also, the plurality of door opening modes may include an opening mode in which all the doors are opened.

Also, in the case of the left and right doors that open one storage chamber, the left door may be opened in a first mode, and the right door may be opened in a second mode. Of course, vice versa may be possible. Also, in the first mode, one of the left door and the right door may be opened, and in the second mode, all of the left and right doors may be opened.

In this embodiment, the user may select the plurality of door opening modes while preventing the door from being automatically opened against the user's intention.

As illustrated in FIG. 8, the initial operation (S100) for opening the door may be performed, and whether the door is opened may be determined (S110) through the door switch. When it is determined that the door is closed, whether the condition for the door opening is satisfied may be performed at last.

When the sensor 115 determines whether the user approaches the refrigerator (S130), and the sensor 115 senses that the sensed value is within a threshold value, i.e., when the user is sensed to be within the sensing distance of the sensor, the sensor may determine that the sensor is in the sensing-on. Here, primary determination (S140) in which the sensing-on duration time is compared with a preset time T1 is performed.

Here, the preset time T1 is a time for checking whether the user approaches the refrigerator with the door opening intension. Thus, for example, if the user maintains the approach for 1 second or more, which is the preset time T1, it may be primarily determined that the user intends to open the door. Alternatively, if the user is only sensed for a very short time to pass through the refrigerator, it may be returned to the initial operation. As a result, the opening of the door due to the malfunction may be prevented.

In the embodiment, the operations S100 to S140 may be the same those in the foregoing embodiment.

In this embodiment, as in the forgoing embodiment, an operation (S210) of secondarily determining the door opening intention of the user may be performed. Basically, the secondary determination (S210) is similar to the secondary determination (S80) according to the foregoing embodiment.

However, in this embodiment, a plurality of opening modes in which the plurality of doors are opened may be provided. Thus, an operation of determining which mode has to be performed before the secondary determination may be performed.

Figure 9:
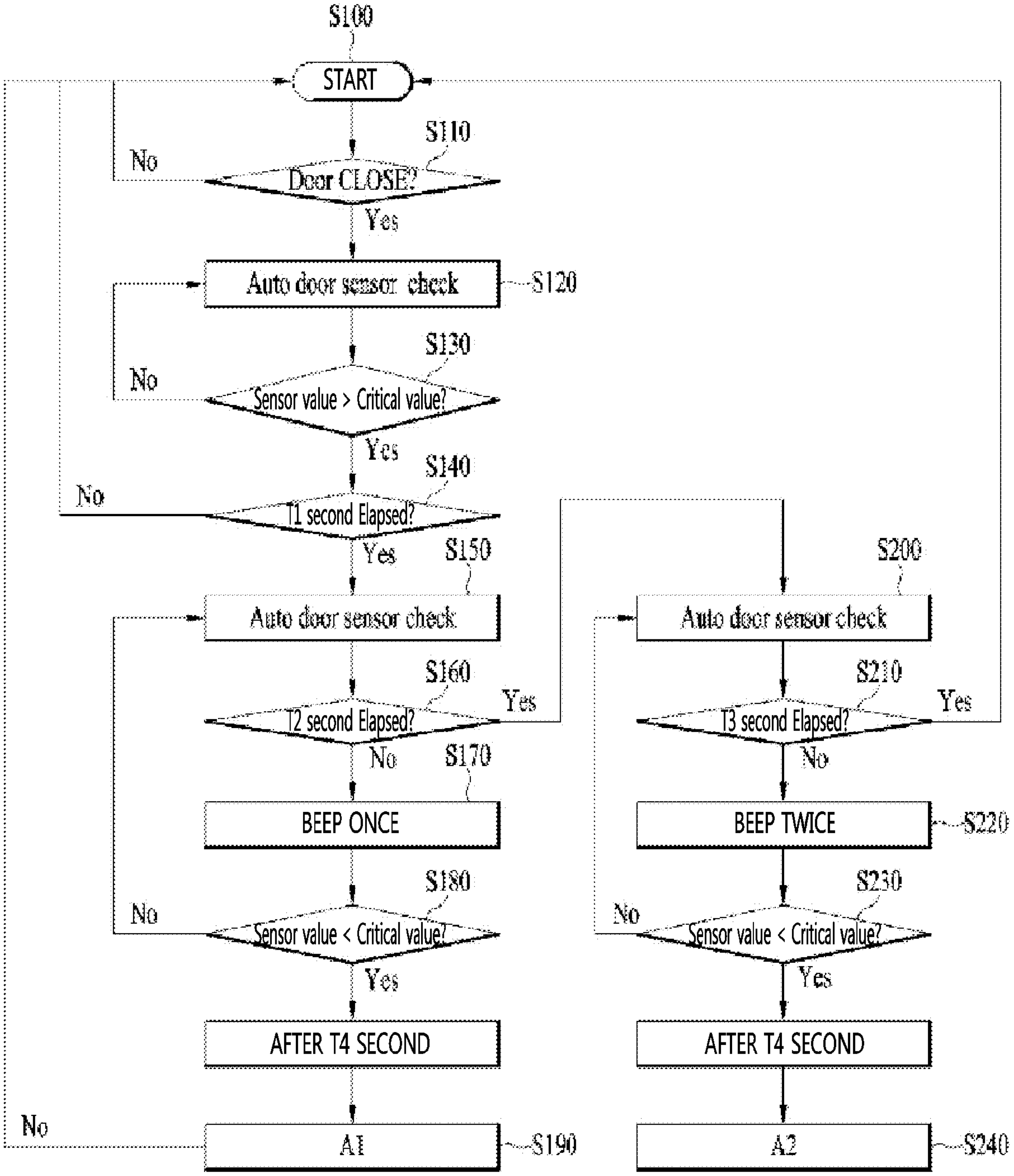
FIG. 9 is a flowchart illustrating a control method according to another embodiment of the present invention.

In FIG. 9, for example, the plurality of door opening modes may be divided into an operation (S190) of performing the first mode as an A1 mode and an operation (S240) of performing the second mode as an A2 mode.

Here, the plurality of doors may be opened in different forms in the first mode and the second mode, and also, the user may select the modes. For example, the user may select the modes so that the left door is opened in the first mode, and the right door is opened in the second mode. On the other hand, the user may select the modes so that the right door is opened in the first mode, and the left door is opened in the second mode. Also, the user may select the modes so that the right door is opened in the first mode, and all of the left and right doors are opened in the second mode. Thus, the form in which the doors are opened according to the plurality of modes may satisfy the user's preference by the user's selection.

After the primary determination (S150), the sensing-off (S180) may be performed. After the primary determination (S150), a time spent until the sensing-off (S180) is performed may be counted. That is, when the door opening intention of the user is confirmed in the primary determination (S150), the user may move away from the refrigerator. That is, to secure the opening space of the door, the user may move slightly away from the refrigerator. Here, when the spent time is less than a preset time T2, it may be determined that the first mode is selected. That is, first mode selection (S160) may be performed.

In the selection (S160), only whether the first mode is selected may be determined. When it is determined that the first mode is selected, an operation (S190) of driving the door opening device according to the first mode may be performed. Also, whether the user intends to finally open the door is not determined in the selection (S160).

The user may move away from the refrigerator a little longer. That is, in the selection (S160), the first mode may not be selected. That is, when the sensing-off is performed within the preset time T2 in the selection (S160), the sensing (S200) may be performed again through the sensing sensor. Here, the secondary mode selection (S210) may be performed again. The secondary mode selection (S210) may be an operation of determining whether the second mode is selected. Also, the secondary mode selection (S210) may be an operation of secondarily determining whether the user intends to open the door. That is, the secondary mode selection may be an operation of selecting the secondary mode and finally determining whether the user intents to open the door.

In the secondary mode selection (S210), when the sensing-off (S230) is sensed within a preset time T3, it may be determined that the user selects the secondary mode. Also, when the sensing-off (S230) is not sensed during the preset time T3, it may be finally determined that the user does not intent to open the door. In this case, It may be said that the user is cleaning in front of the refrigerator or simply leaning on the refrigerator.

Thus, in this embodiment, similarly to the foregoing embodiment, it may finally confirm the user's intention to open the door on the basis of the time spent for the sensing-off after the sensing-on. When the time is finally longer than the sum of the times T2 and T3, the door may be prevented from automatically opening.

Also, the time taken from the sensing-on to the sensing-off may be divided into two sections. For example, when the sensing-off is performed within 1 second after the sensing-on, the first opening mode may be determined to be selected in the preceding section. Also, when the sensing-off is performed within 1 second and 2 seconds after the sensing-on, it may be determined that the second opening mode is selected. Alternatively, when the sensing-off is performed after 2 seconds, it may be finally determined that the user does not intent to open the door.

Thus, a desired mode of the plurality of door opening modes may be selected through the two operations (S160 and S200) that are performed after the primary determination. These operations may be referred to as the secondary determination.

Thus, in this embodiment, the door opening mode may be selected on the basis of the different in time, for example, the difference in time spent from the sensing-on to the sensing-off. Thus, the door opening mode may be selected very effectively and intuitively.

In this embodiment, notification may be performed as in the foregoing embodiment. That is, the scheduled opening of the door and the scheduled operation of the door opening device may be previously notified.

Here, the notification may be an operation of notifying which mode the door is opened. That is, different types of notification may be performed depending on the mode.

To perform the first mode, notification (S170) of ringing a beep sound once and notification (S220) of ringing a beep sound twice may be performed to perform the first mode. Thus, the user may intuitively understand which mode the door is opened through the notification (S170 and S220) that are distinguished from each other.

FIG. 9 sequentially illustrates the operations S160 to S180. However, this operations may not be sequentially performed but performed at the same time. Also, the notification (S170) may be performed after the operation S180. The operations S210 to S230 may be the same.

INDUSTRIAL APPLICABILITY

According to the embodiment of the present invention, since the refrigerator that is easily used by reducing the user's force required for opening the door of the refrigerator is provided, the industrial applicability is remarkable.

What is claimed is:

1. A refrigerator comprising:
a cabinet including a storage chamber;
a door configured to open and close at least a portion of the storage chamber;
a door switch configured to sense whether the door is opened or closed;
a sensor configured to sense whether a user is within a sensing distance;
a door opening device configured to automatically open the door, the door opening device comprising a rack that is configured to be moved linearly by a motor;
a notification device configured to notify the door is scheduled to be opened to the user; and
a controller configured to:

initialize a driving condition of the door opening device based on the door switch sensing a closed state of the door, determine whether the sensor detects a presence of the user within the sensing distance, count a first time based on the presence of the user within the sensing distance, turn on the notification device based on the first time being greater than a first preset time, count a second time from turning on the notification device until the user is no longer within the sensing distance, and drive the motor based on a sum of the first time and the second time being less than a second preset time.

2. The refrigerator of claim 1, wherein the door comprises:

a first door configured to open and close a first portion of the storage chamber; and a second door configured to open and close a second portion of the storage chamber different from the first portion, and wherein the first door and the second door are arranged side by side.

3. The refrigerator of claim 2, wherein the controller is configured to control driving of the door opening device in one of a plurality of door opening modes, and wherein the plurality of door opening modes comprise a first mode configured to open one of the first and second doors.

4. The refrigerator of claim 3, wherein the plurality of door opening modes further comprise a second mode configured to open all of the first and second doors.

5. The refrigerator of claim 2, wherein the rack is provided in a plurality of racks for respectively opening the first and the second door.

6. The refrigerator of claim 2, wherein the door opening device includes (i) a first door opening device configured to open the first door and (ii) a second door opening device configured to open the second door.

7. The refrigerator of claim 1, wherein the controller is configured to select one of a plurality of door opening modes according to a time spent till the user is no longer within the sensing distance, and wherein the notification device is configured to, based on the first time is less than a third preset time, generate of a first notification for a first mode of the door opening modes.

8. The refrigerator of claim 7, wherein the notification device is configured to, based on the second time being greater than the third preset time and less than a fourth preset time, generate of a second notification for a second mode of the door opening modes.

9. The refrigerator of claim 8, wherein the first notification is ringing a beep sound once, and the second notification is ringing a beep sound twice.

10. The refrigerator of claim 1, wherein the notification device is configured to generate beeps based on the controller activating the notification device.

11. The refrigerator of claim 1, wherein the rack has a shape protruding at an angle that is perpendicular to the door based on the rack protruding from the door opening device such that the rack moves in a same direction as a thickness direction of the door.

12. The refrigerator of claim 1, wherein the rack has a shape protruding at an angle that is diagonal to the door based on the rack being inside the door opening device such that the rack moves in a direction that is tilted with respect to a thickness direction of the door.

13. The refrigerator of claim 1, wherein the rack has a length greater than a thickness of the door.

14. The refrigerator of claim 1, wherein the door opening device further includes a gear, and wherein the rack includes (i) a first portion having a straight line shape and contacting the door and (ii) a second portion having a curved line shape and contacting the gear.

15. The refrigerator of claim 1, further comprising a lighting device provided on the storage chamber, wherein the controller is configured to turn on the lighting device based on the door switch sensing an opened state of the door.

16. The refrigerator of claim 15, wherein the controller is configured to turn off the lighting device based on the door switch sensing the closed state of the door.

17. The refrigerator of claim 1, wherein the sensor is mounted on a front surface of the door.

18. The refrigerator of claim 1, wherein the controller is configured to initialize the driving condition of the door opening device based on the sum of the first time and the second time being greater than the second preset time.

* * * * *